United States Patent
Dalke

(10) Patent No.: US 10,048,737 B2
(45) Date of Patent: Aug. 14, 2018

(54) METHOD FOR OPERATING AN INFOTAINMENT SYSTEM, INFOTAINMENT SYSTEM AND VEHICLE

(71) Applicant: Audi AG, Ingolstadt (DE)

(72) Inventor: Christoph Dalke, Kipfenberg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 15/523,646

(22) PCT Filed: Nov. 13, 2015

(86) PCT No.: PCT/EP2015/002272
§ 371 (c)(1),
(2) Date: May 1, 2017

(87) PCT Pub. No.: WO2016/102035
PCT Pub. Date: Jun. 30, 2016

(65) Prior Publication Data
US 2017/0313268 A1    Nov. 2, 2017

(30) Foreign Application Priority Data

Dec. 22, 2014  (DE) ................. 10 2014 019 435

(51) Int. Cl.
*G06F 1/32* (2006.01)
*B60R 16/03* (2006.01)
*B60K 35/00* (2006.01)

(52) U.S. Cl.
CPC ............ *G06F 1/3203* (2013.01); *B60K 35/00* (2013.01); *B60R 16/03* (2013.01); *G06F 1/3228* (2013.01);
(Continued)

(58) Field of Classification Search
CPC .... G06F 1/3203; G06F 1/3228; G06F 1/3231; B60R 16/03; B60K 35/00
See application file for complete search history.

(56) References Cited

U.S. PATENT DOCUMENTS 5,073,943 A * 12/1991 Chapman ............... H04B 1/205
                                                381/86
5,367,665 A    11/1994 Koch et al.
(Continued)

FOREIGN PATENT DOCUMENTS

DE      4112334 A1    10/1992
DE     19853892 C1     5/2000
(Continued)

OTHER PUBLICATIONS

English-language abstract of German Patent Application Publication No. 199 52 112 A1, published Jun. 7, 2001; 1 page.
(Continued)

*Primary Examiner* — Stefan Stoynov
(74) *Attorney, Agent, or Firm* — Sterne, Kessler, Goldstein & Fox P.L.L.C.

(57) ABSTRACT

The invention relates to a process for operating an infotainment system with the following steps. In a first step, the infotainment system is operated in a first operating state. In a second step, the infotainment system is operated in a first energy-saving state. In a third step, a timer is provided for waking up an operating state management mechanism of the infotainment system at a wake-up time. In a fourth step, the infotainment system is placed in a second energy-saving state. In a fifth step, the operating state management mechanism of the infotainment system is woken at a wake-up time by means of a timer. In a sixth step, the infotainment system is operated in the first energy-saving state.

17 Claims, 4 Drawing Sheets

(52) U.S. Cl.
CPC ........ *G06F 1/3231* (2013.01); *B60K 2350/35* (2013.01); *G09G 2330/022* (2013.01); *G09G 2330/023* (2013.01); *G09G 2354/00* (2013.01); *G09G 2380/10* (2013.01)

(56) References Cited

U.S. PATENT DOCUMENTS

| | | | |
|---|---|---|---|
| 6,059,843 | A | 5/2000 | Kirkhart |
| 6,373,237 | B1 | 4/2002 | Oldendorf et al. |
| 6,944,779 | B2 | 9/2005 | Alexander et al. |
| 8,423,242 | B2 | 4/2013 | Ochiai et al. |
| 8,843,277 | B2 | 9/2014 | Fuchs et al. |
| 2006/0053315 | A1 | 3/2006 | Menzl |
| 2011/0022264 | A1* | 1/2011 | Conan ............... B60R 25/20 701/36 |
| 2011/0082616 | A1* | 4/2011 | Small ............... B60K 35/00 701/31.4 |
| 2012/0311361 | A1* | 12/2012 | Locker ............... G06F 1/3234 713/323 |
| 2015/0106540 | A1 | 4/2015 | Hoffmann et al. |

FOREIGN PATENT DOCUMENTS

| | | |
|---|---|---|
| DE | 10159247 A1 | 7/2002 |
| DE | 69911393 T2 | 6/2004 |
| DE | 19952112 A1 | 6/2007 |
| DE | 102010009058 A1 | 8/2011 |
| DE | 102012014724 B3 | 9/2013 |
| DE | 112010003036 B4 | 2/2015 |
| GB | 2491895 A | 12/2012 |

OTHER PUBLICATIONS

International Research Report and Written Notice of the International Research Authority or Declaration directed to related International Patent Application No. PCT/EP2015/002272, dated Apr. 18, 2016, with attached English-language translation; 24 pages.

\* cited by examiner

METHOD FOR OPERATING AN INFOTAINMENT SYSTEM, INFOTAINMENT SYSTEM AND VEHICLE

TECHNICAL FIELD

The present invention relates to a process for operating an infotainment system with the following steps. In a first step, the infotainment system is operated in a first operating state. In a second step, the infotainment system is operated in a first energy-saving state, in which an average power consumption of the infotainment system is less than in the first operating state. In an additional step, the infotainment system is placed in a second energy-saving state, in which an average power consumption of the infotainment system is less than in the first operating state.

In addition, the invention relates to an infotainment system, which is prepared to execute this process.

Further, the invention relates to a vehicle, which, thus, has an infotainment system and/or is prepared to operate an infotainment system according to this process. The vehicle may be a land-based vehicle, an aircraft, a ship, a personal motor vehicle, a commercial vehicle, a bus, an agricultural machine or a construction machine.

BACKGROUND

With active route guidance, current infotainment systems remain in a specified follow-up time (of 15 minutes, for example) after a vehicle is switched off. If a vehicle user uses the vehicle key to open one of the vehicle doors or to switch on the ignition within this follow-up time (time frame), only parts of the infotainment system have to be started. After the vehicle key is used, a navigation map is immediately displayed, for example, and the vehicle user can immediately enter a new destination. With this process, the infotainment system is fully booted within about four seconds and offers the user unlimited access to its functions starting from this time. However, if the vehicle user uses the vehicle key outside of the follow-up time to open one of the vehicle doors or to switch on the ignition, the infotainment system will already be in deep-sleep mode and will have to be completely booted up from the deep-sleep state. About 60 to 80 seconds will then be required until complete availability of all functions. Because the vehicle user often returns to the vehicle after the follow-up time and uses the vehicle key, the user must frequently wait 60 to 80 seconds for complete availability of the infotainment system.

DETAILED DESCRIPTION

Figure 2:
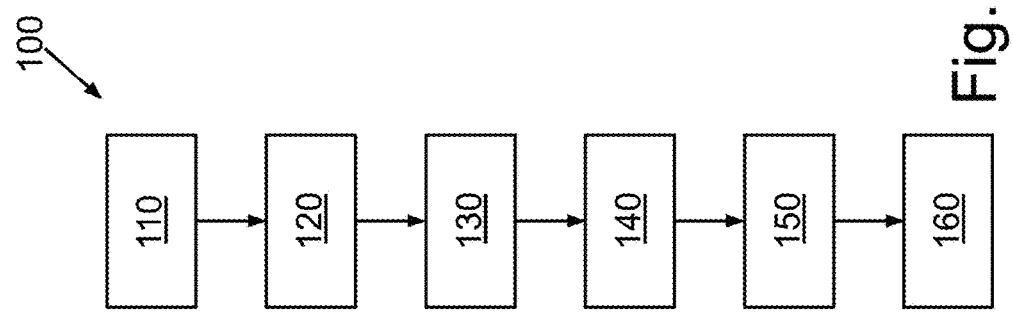
FIG. 2 shows a schematic flowchart of the process according to the invention.

The object of the present invention is to improve the usage comfort of the infotainment system by reducing the waiting period upon return, after the follow-up time, for complete availability of the infotainment system. For reasons related to cost and approvals, this problem (at least as of today) cannot be easily overcome by extending the possible follow-up time. With the current battery budget and in order to ensure priority start capability of the vehicle, the maximum possible follow-up time in the suspend-to-RAM state (first energy-saving state) is eight hours, for example.

The object of improving a usage comfort of the infotainment system is achieved according to the invention by means of a process according to claim 1, an infotainment system according to claim 9, and a vehicle according to claim 10.

The process according to the invention for operating an infotainment system has the following steps. In a first step, the infotainment system is operated in a first operating state. In a second step, the infotainment system is operated in a first energy-saving state, in which an average power consumption of the infotainment system is less than in the first operating state. In a third step, a timer is provided for waking up an operating state management mechanism of the infotainment system at a wake-up time. In a fourth step, the infotainment system is placed in a second energy-saving state, in which an average power consumption of the infotainment system is less than in the first operating state. In a fifth step, the operating state management mechanism of the infotainment system is woken at a wake-up time by means of a timer. In a sixth step, the infotainment system is operated in the first energy-saving state. The third step can also take place before the second or even before the first step.

Accordingly, an infotainment system is proposed that is ready to operate according to the process in conformance with the invention.

In addition, a vehicle is provided, which has an infotainment system according to the invention and/or is prepared to operate an infotainment system according to the process in conformance with the invention.

A concept of the invention can be seen as the maximum possible follow-up time is divided into a (shortened) follow-up time (first operating phase) in the first energy-saving state and a second operating phase in the first energy-saving state. In doing so, the length of the (shortened) follow-up time may be, for example, two hours and the length of the second operating phase with the first energy-saving state may be, for example, three to four hours. Due to the division of time in the maximum possible follow-up time in the first energy-saving state, a probability of rapid complete availability of the infotainment system for the vehicle user is increased, thus an average wait time for quick complete availability of the infotainment system is reduced. Due to the, on average, quicker availability of the infotainment system, user comfort is improved without a larger energy storage device (vehicle battery) having to be installed in the vehicle (which would have significant weight and cost disadvantages).

The invention concept can also be implemented in multiple stages. In particular, more than two energy-saving states can be provided in which the infotainment system has average power consumptions that are different with respect to one another. For example, the different energy-saving states may differ through a selection of components or operating modes of the infotainment system that can be temporarily deactivated, which are active in the respective energy-saving state. Components that can be temporarily deactivated may be, for example, individual processor cores and/or peripheral units (display, interfaces, drives for example).

In a preferred embodiment, the wake-up time is determined with consideration of a usage behavior, which took place before the first operation. By adapting the wake-up time to a user behavior, an average wait time can be even further reduced, until complete availability of the infotainment system. In a preferred further embodiment, the usage behavior is determined specific to a vehicle user and/or parking location. An average wait time until complete availability of the infotainment system can also be optimized, i.e. reduced, hereby. Thus, depending on the individual daily routine, various vehicle users (other users of the vehicle) may be characterized by very different vehicle usage profiles that may differ with respect to both usage times as well as parking locations. A parking location here refers to a geographic location at which the vehicle is parked (for example, parking bays parking spaces, car parks, and parking garages).

It may be suitable for the wake-up time to take place with consideration of an entry that is contained in an electronic calendar of a vehicle user or of the vehicle. Hereby, not only a wake-up time can be adapted to a user behavior with respect to user or parking location, but a situation-specific optimization of the time even possible while the infotainment system is maintained in the first energy-saving state.

It is especially advantageous when a follow-up time of the first operation of the infotainment system in the first energy-saving state is determined while considering a residual charge of an electric energy storage device. It may be advantageous if a longer follow-up time is selected when there is a high charging state of the energy storage device, while a shorter follow-up time is selected when there is a low charging state of the energy storage device. For example, it may be reasonable for the first and second operation of the infotainment system in the first energy-saving state to determine a total time, which comprises two operating phases with the first energy-saving state, with the total length thereof depending on the size of the residual charge of the electric energy storage device. For reasons of simplification, the infotainment system can then, for example, apply a constant allocation ratio for dividing the determined total time to the two operating phases with the first energy-saving state.

There are also advantages when the length of the maximum time frame of the second operation of the infotainment system in the first energy-saving state is determined while considering a residual charge of an electric energy storage device. It may be advantageous if the infotainment system is operated for a longer time in the first energy-saving state with the second operation of the infotainment system when there is a high charging state of the energy storage device, while it is operated for a shorter time in the first energy-saving state when there is a low charging state of the energy storage device.

It is also appropriate if the infotainment system is moved from the first energy-saving state into the first operating state as soon as a vehicle door or vehicle trunk lid is opened in a vehicle in which the infotainment system is arranged. Thus, the transition of the infotainment system into the first operating state is chronologically moved forward so that it is already in the first operating state when the vehicle user uses the vehicle key. It is particularly advantageous when the infotainment system is placed in the deep-sleep in the first energy-saving state after a defined time frame of the second operation of the infotainment system. This will ensure that the info system does not access a protected residual charge in the energy storage device. This feature can be offered, for example, in those cases for maintaining the starting capacity of the vehicle when the energy storage device must have a minimum charge in order to start the vehicle. In today's vehicles, an activation button is often provided for activating the infotainment system, the use of which is likewise detected by the invention process, just as the use of a vehicle key to activate the infotainment system. The same thing applies if present to the use of an engine start button.

Additional protection of the charge of the energy storage device and, thus, improvement of an availability of all of the functions of the infotainment system can be achieved if the infotainment system is placed into the second energy-saving state as a function of a distance of one or more vehicle users from the vehicle. Once all potential vehicle users are at a greater distance away from the vehicle, for example at a distance of more than 50 m, a quick entry of the vehicle by the vehicle user cannot be expected. Consequently, the infotainment system can be maintained in deep sleep in order to protect the charge in the energy storage device as long as all potential vehicle users are more than 50 m away from the vehicle. The current distance of each vehicle user away from the vehicle can be monitored, for example, by means of a smart phone app intended for this purpose. The smart phone app can transmit a signal to the vehicle when a defined minimum distance, for example 50 m (for example via a mobile telephone network), is no longer maintained in order to wake the infotainment system out of the second energy-saving state.

The advantages and further embodiments, described in connection with the process according to the invention, can also be transferred in a similar manner to the vehicle according to the invention.

Figure 1:
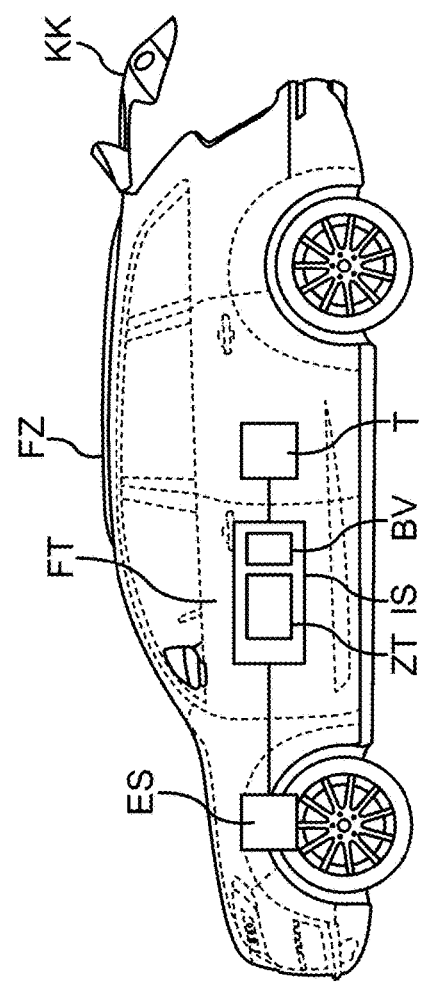
FIG. 1 shows a schematic representation of an arrangement of an infotainment system in a vehicle.
Figure 3:
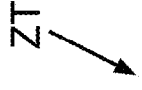
FIG. 3 is a schematic representation of a numerical table for counting time frame-specific startup processes.
Figure 4:
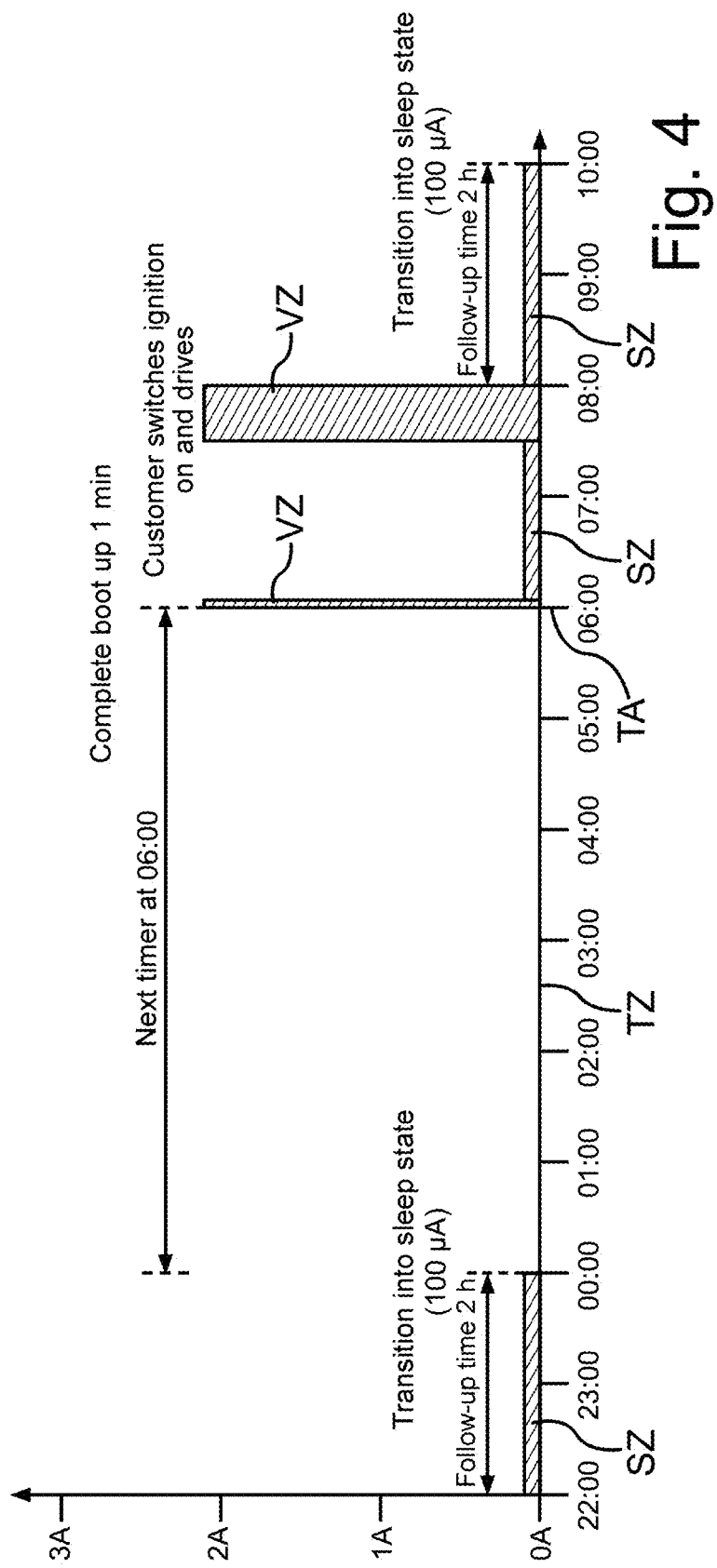
FIG. 4 is a first schematic example of a readiness and startup procedure.
Figure 5:
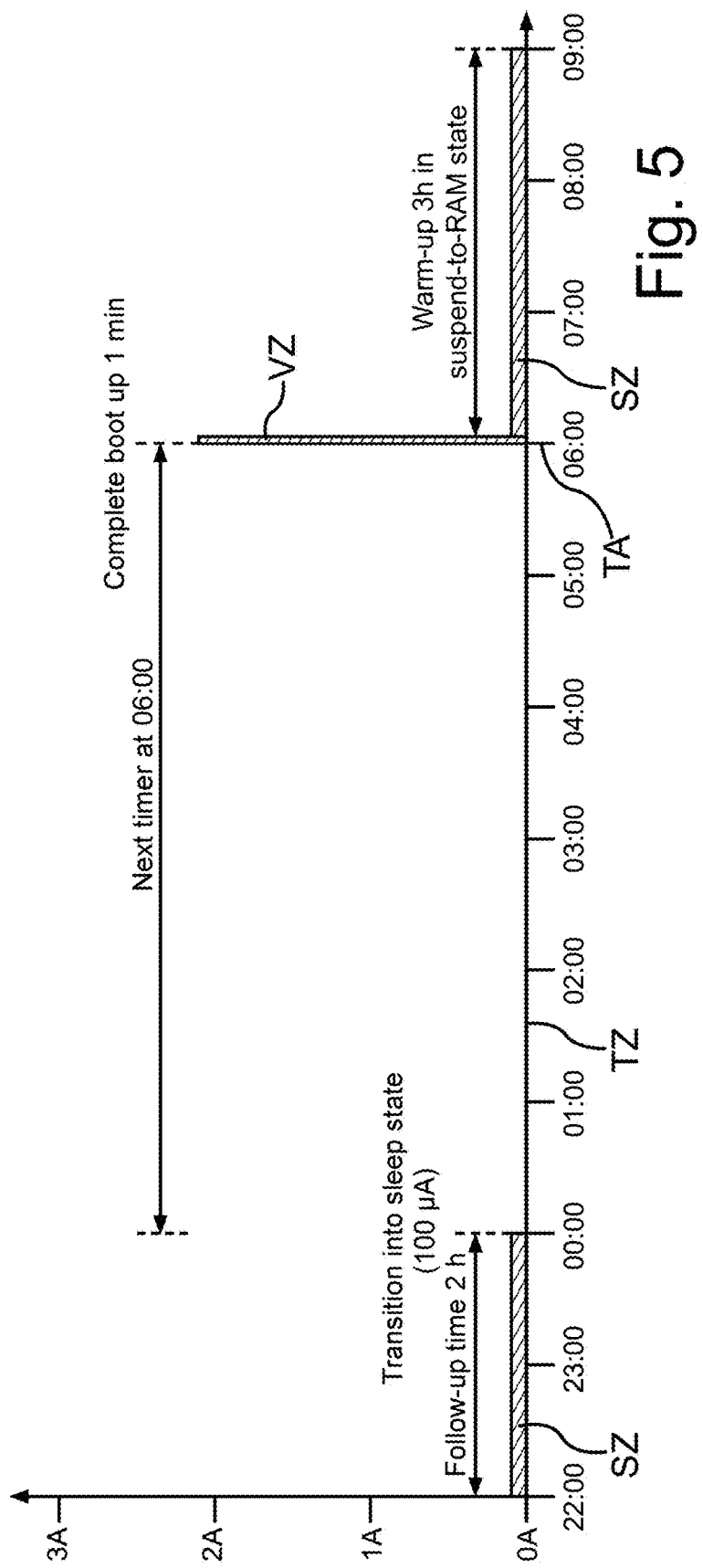
FIG. 5 is a second schematic example of a readiness and startup procedure.

The present invention will now be explained in more detail as follows using the accompanying drawings. The following is shown:

FIG. 1 shows a schematic representation of an arrangement of an infotainment system in a vehicle;

FIG. 2 shows a schematic flowchart of the process according to the invention;

FIG. 3 is a schematic representation of a numerical table for counting time frame-specific startup processes;

FIG. 4 is a first schematic example of a readiness and startup procedure; and FIG. 5 is a second schematic example of a readiness and startup procedure.

The exemplary embodiments described in detail as follows represent preferred embodiments of the present invention.

FIG. 1 shows an arrangement of a vehicle FZ with an energy storage device ES, a timer T (real-time clock) and an infotainment system IS, which can be operated with electric power from the energy storage device ES.

The process 100, shown in FIG. 2, for operating an infotainment system IS has the following steps. In a first step 110, the infotainment system IS is operated in a full operating state VZ (first operating state). In a second step 120, the infotainment system IS is operated in a suspend-to-RAM state SZ (first energy-saving state). In a third step 130, a timer T is provided for waking up an operating state management mechanism BV of the infotainment system IS at a wake-up time TA. In a fourth step 140, the infotainment system IS is placed in a deep-sleep state TZ (second energy-saving state). In a fifth step 150, the operating state management mechanism BV of the infotainment system IS is woken at a wake-up time TA by means of a timer T. In a sixth step 160, the infotainment system IS is operated in a suspend-to-RAM state SZ (first energy-saving state). The third step 130 can also take place before the second 120 or even before the first 110 step.

A provision of an advantageous option is that the operating state management mechanism BV executes and/or initiates one or more update processes (for example, retrieval of data via radio, checking and/or adjustment of vehicle states) after wake-up (step 150) and before placement (step 160) of the infotainment system IS into the first energy-saving state.

In a preferred embodiment, the infotainment system IS is prepared to determine (to learn) the wake-up time TA by means of a usage behavior, which took place before the first operation 110. To this end, there is a determination in a previous time frame (for example) over multiple days or weeks) as to how many startup processes take place in what time frames. The temporal resolution can be, for example, an hour, a half hour, a quarter hour, or even 10 minutes. In an especially preferred embodiment, a provision is that the recording of data take place in the time frame-specific startup processes specific to the weekday. This is advantageous for the many vehicle users that maintain weekday-specific daily routines, for example, based on part-time work or for other reasons. Essentially, it would also be possible; however, to only differentiate between workdays (with or without Saturdays) and non-workdays (without or with Saturdays) when counting the startup processes.

FIG. 3 shows a numerical table ZT for recording numerical data of time frame-specific startup processes. The numbers of time frame-specific startup processes of the vehicle FZ or of the infotainment system IS are implemented herein in a 7×24 h grid and counted in the numerical table ZT.

It is appropriate to provide a function (relaxation function), which ensures that startup events, occurring further back in time, have less effect on the evaluation results in a subsequent evaluation of the numerical table ZT than startup events occurring more recently. This can be prepared, for example, in that a recording time, which is not shown in the figures, is also stored in the numerical table ZT along with each startup event. An alternative option exists in that each entry in the numerical table ZT is reduced regularly (for example, every four or eight weeks) by a fixed amount (for example, by one) or a percentage amount (for example, 10% of the respective time frame-specific entry). Thus, startup processes can be recorded on a rolling basis over a most recent time frame.

The infotainment system IS evaluates the numerical table ZT shown in FIG. 3 and, in doing so, recognizes that there is an accumulation of startup processes on Monday between 6 AM and 9 AM. Originating from this, a wake-up of the infotainment system IS would be initiated at 5:30 AM in order to exit the second suspend-to-RAM state SZ by 8:30 AM. On Tuesday, a wake-up of the infotainment system IS would be initiated at 5:00 AM, to exit the second suspend-to-RAN state SZ by 8:00 AM.

FIG. 4 shows the following example. There is a startup of the vehicle FZ at 7 AM each Monday. The current time is Sunday at 10 PM. A timer T (real-time clock) is programmed to 6 AM (7 AM-1 hour). At 6 AM the infotainment system boots up and it transitions to a second suspend-to-RAM state SZ. When the vehicle user places the vehicle FZ in operation at 7:30 AM, the infotainment system IS must only transition from the second suspend-to-RAM state SZ into the full operating state VZ. This process requires (as previously mentioned) only about 4 seconds for example.

FIG. 5 shows the same example in the event that a vehicle user does not place the vehicle PZ in operation within the second suspend-to-RAM state SZ (of the second operating phase with the first energy-saving state). In this case, the infotainment system IS transitions to the deep-sleep state TZ at 9 AM (i.e. 3 hours after the wake up time) by means of the timer T (real-time clock).

The average wait time for full functionality of the infotainment system IS can be additionally shortened, from the perspective of the vehicle user, with the transition of the infotainment system IS commences from the suspend-to-RAM state SZ (first energy-saving state) into the full operating state VZ (first operating state), if a vehicle door FT or trunk lid KK, in a vehicle FZ in which the infotainment system IS is arranged, opened.

By allocating the maximum possible follow-up time to a first operating phase 120 (shortened follow-up time) in the suspend-to-RAM state SZ (first energy-saving state) and a second operating state 160 in the suspend-to-RAM state SZ (first energy-saving state), a probability for rapid complete availability of the infotainment system IS for the vehicle user is increased, that is an average wait time for a quick complete availability of the infotainment system IS is reduced. Due to the on average quicker availability of the infotainment system IS and, thus, associated reduction in the wait time, user comfort is improved without the installation of a larger energy storage device (EX) (vehicle battery) in the vehicle (which normally causes significant weight and cost disadvantages). The duration of the first operating phase 120 (shortened follow-up time) in the suspend-to-RAM state SZ can be, for example, 2 hours, and the duration of the second operating phase 160 in the suspend-to-RAM state SZ can be, for example, 3 to 4 hours.

The invention claimed is:

1. A method for operating an infotainment system, comprising:
   operating the infotainment system in a first operating state;
   operating the infotainment system in a first energy-saving state, wherein a first average power consumption of the infotainment system during the first energy-saving state is less than an average power consumption of the infotainment system in the first operating state;
   provisioning a timer for waking up an operating state management mechanism of the infotainment system at a wake-up time;
   placing the infotainment system into a second energy-saving state, wherein a second average power consumption of the infotainment system during the second energy-saving state is less than the first average power consumption of the infotainment system during the first energy-saving state;
   waking up the operating state management mechanism of the infotainment system at the wake-up time based on the timer;
   operating the infotainment system in the first energy-saving state in response to the waking up; and
   after the waking up and before operating the infotainment system n the first energy-saving state in response to the waking up, operating the infotainment system in the first operating state to automatically perform an update process in anticipation of a vehicle user switching on an ignition of a vehicle.

2. The method of claim 1, wherein the wake-up time is based on a usage behavior, the usage behavior occurring before the operating of the infotainment system in the first operating state.

3. The method of claim 1, wherein the wake-up time is based on an entry that is contained in an electronic calendar of the vehicle or the vehicle user.

4. The method of claim 1, further comprising determining a lag time of the operating of the infotainment system in the first energy-saving state based on a residual charge of an electric energy storage device.

5. The method of claim 4, further comprising determining a maximum time duration of the operating of the infotainment system in the first energy-saving state in response to the waking up based on the residual charge of the electric energy storage device.

6. The method of claim 5, wherein the infotainment system is coupled to the vehicle, the method further comprising transitioning the infotainment system from the first energy-saving state into the first operating state when a vehicle door of the vehicle or a vehicle trunk lid of the vehicle is opened.

7. The method of claim 1, wherein the infotainment system is coupled to the vehicle, the method further comprising transitioning the infotainment system into the second energy-saving state based on a function of a distance between one or more vehicle users from the vehicle.

8. The method of claim 1, wherein the first operating state is a full operating state, the first energy-saving state is a suspend-to-RAM state, and the second energy-saving state is a deep-sleep state.

9. The method of claim 1, wherein the infotainment system is coupled to the vehicle.

10. The method of claim 1, wherein the update process is for checking and adjusting a vehicle state.

11. A vehicle, comprising:
an infotainment system, configured to:
  operate in a first operating state;
  operate in a first energy-saving state, wherein a first average power consumption of the infotainment system during the first energy-saving state is less than an average power consumption of the infotainment system in the first operating state;
  provision a timer for waking up an operating state management mechanism of the infotainment system at a wake-up time;
  transition into a second energy-saving state, in which a second average power consumption of the infotainment system during the second energy-saving Mate is less than the first average power consumption of the infotainment system during the first energy-saving state;
  wake up the operating state management mechanism at the wake-up time based on the timer;
  operate in the first energy-saving state in response to the waking up; and
  after the waking up and before operating the infotainment system in the first energy-saving state in response to the waking up, operate the infotainment system in the first operating state to automatically perform an update process in anticipation of a vehicle user switching on an ignition of the vehicle.

12. The vehicle of claim 11, wherein the wake-up time is based on a usage behavior, the usage behavior occurring before the operating in the first operating state.

13. The vehicle of claim 11, wherein the wake-up time is based on an entry that is contained in an electronic calendar of the vehicle or the vehicle user.

14. The vehicle of claim 11, wherein the infotainment system is further configured to determine a lag time of the operating in the first energy-saving state based on a residual charge of an electric energy storage device.

15. The vehicle of claim 14, wherein the infotainment system is further configured to determine a maximum time duration of the operating in the first energy-saving state in response to the waking up based on the residual charge of the electric energy storage device.

16. The vehicle of claim 15, further comprising:
a vehicle door; and
a vehicle trunk lid;
wherein the infotainment system is further configured to transition from the first energy-saving state into the first operating state when the vehicle door or the vehicle trunk lid is opened.

17. The method of claim 11, wherein the update process is for checking and adjusting a vehicle state.

* * * * *